(12) United States Patent
Ishihara et al.

(10) Patent No.: US 7,646,560 B2
(45) Date of Patent: Jan. 12, 2010

(54) POSITIONING CONTROL SYSTEM AND POSITIONING CONTROL METHOD

(75) Inventors: Yoshiyuki Ishihara, Kawasaki (JP);
Shinji Takakura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/206,105

(22) Filed: Sep. 8, 2008

(65) Prior Publication Data

US 2009/0073600 A1 Mar. 19, 2009

(30) Foreign Application Priority Data

Sep. 11, 2007 (JP) .............................. 2007-235408

(51) Int. Cl.
*G11B 5/596* (2006.01)
(52) U.S. Cl. .................................................. 360/77.04
(58) Field of Classification Search ........................ None
See application file for complete search history.

(56) References Cited

U.S. PATENT DOCUMENTS 6,437,936 B1   8/2002   Chen et al.
6,751,046 B1 *  6/2004   Szita et al. ............... 360/77.04
6,950,268 B2   9/2005   Inoue et al.

FOREIGN PATENT DOCUMENTS

JP     2006-313589     11/2006

* cited by examiner

*Primary Examiner*—K. Wong
(74) *Attorney, Agent, or Firm*—Turocy & Watson, LLP

(57) ABSTRACT

There is provided with a positioning control system including: a head moving unit; a position detecting unit detecting a head position at predetermined time intervals; an error detecting unit detecting a position error of the head for a target position; a disturbance detecting unit detecting a non-periodic disturbance; a modifying unit modifying a first position error signal corresponding to a first head position detected in a first rotation period based on a second position error signal corresponding to a second head position detected one period length before; and a feedback controller, wherein the modifying unit modifies the first signal after reducing an amplitude of the second position error signal when a detected timing of the second head position is included in a predetermined time range with respect to a detected timing of the non-periodic disturbance detected in a second rotation period which is one period before the first rotation period.

8 Claims, 6 Drawing Sheets

POSITIONING CONTROL SYSTEM AND POSITIONING CONTROL METHOD

CROSS REFERENCE TO RELATED APPLICATIONS

This application is based upon and claims the benefit of priority from the prior Japanese Patent Applications No. 2007-235408, filed on Sep. 11, 2007; the entire contents of which are incorporated herein by reference.

BACKGROUND OF THE INVENTION

1. Field of the Invention

The present invention relates to a positioning control system and a positioning control method which perform positioning control of a head, for example in a magnetic disk device.

2. Related Art

In a head positioning control system of a magnetic disk device, a periodic disturbance which is caused by eccentricity of a disk, or the like, and which is synchronized with the rotation frequency of the disk is added to a head position error signal (signal representing an error between a target head position and a present head position) obtained by reproducing data including in a servo sector. Thus, when the periodic disturbance is not suppressed, it is difficult to perform highly precise positioning.

The head positioning control system of the magnetic disk device in recent years is configured by a digital control system using a microcomputer, and hence it is effective to perform repetitive control by integrating an internal model (repetitive controller) corresponding to a rotation period length of the magnetic disk into a feedback loop of the head positioning control system. The repetitive controller is configured to improve the head positioning accuracy by suppressing the periodic disturbance in such a way that the position error signal which is inputted into the head positioning control system is recorded in correspondence with the rotation period length, and that the recorded signal is added to the position error signal at the corresponding time of the next rotation period.

However, when a non-periodic disturbance signal is inputted into the above described repetitive controller, there arises a state where the position error signal of the next period has no object to be suppressed. As a result, the output of the repetitive controller becomes a disturbance source which deteriorates the performance of the head positioning control system.

For example, there is considered a two-degree-of-freedom control system in which a same feedback controller is used for the seek control for moving a head to a target track, and is also used for tracking control for positioning the head at the center of the target track. The two-degree-of-freedom control system is generally used in a short distance seek mode in which the number of moving tracks at the time of seeking is comparatively small. In this case, when the above described repetitive controller records a transient position error signal (overshoot, undershoot, and the like) generated at the time when the seek control is completed, the recorded transient position error signal becomes a non-periodic disturbance. As a result, the above described problem of deterioration in the performance of the head positioning control system is caused due to reverse effect phenomenon of repetitive control after the system is shifted to the tracking control.

SUMMARY OF THE INVENTION

According to an aspect of the present invention, there is provided with a positioning control system comprising:

a head moving unit configured to move a head for recording and reproducing of information on a disk on which information can be recorded;

a position detecting unit configured to detect a position of the head at predetermined time intervals;

an error detecting unit configured to detect a position error signal representing an error between a detected head position and a target position set in advance;

a storage configured to store the detected position error signal in association with a detected timing of the head position;

a disturbance detecting unit configured to detect a non-periodic disturbance generated in the head moving unit;

a modifying unit configured to modify a first position error signal corresponding to a first head position detected in a first rotation period of the disk, on the basis of a second position error signal corresponding to a second head position detected one period length before the first head position; and a feedback controller configured to calculate a position control command according to a modified first position error signal and supplies the position control command to the head moving unit, wherein the modifying unit reduces an amplitude of the second position error signal and modifies the first position signal error on the basis of an amplitude-reduced second position error signal, when the non-periodic disturbance is detected in a second rotation period which is one period before the first rotation period and when a detection timing of the second head position is included in a predetermined time range with respect to a detection timing of the non-periodic disturbance.

According to an aspect of the present invention there is provided with a positioning control method comprising:

moving a head for recording and reproducing of information on a disk on which information can be recorded;

moving a head for recording and reproducing of information on a disk on which information can be recorded;

detecting a position of the head at predetermined time intervals;

detecting a position error signal representing an error between a detected head position and a target position set in advance;

recording the detected position error signal in association with a detected timing of the head position in a storage;

detecting a non-periodic disturbance generated at a time of moving of the head;

modifying a first position error signal corresponding to a first head position detected in a first rotation period of the disk, on the basis of a second position error signal corresponding to a second head position detected one period length before the first head position; and calculating a position control command according to a modified first position error signal and supplies the position control command to the head moving unit, wherein the modifying includes reducing an amplitude of the second position error signal and modifying the first position signal error on the basis of an amplitude-reduced second position error signal, when the non-periodic disturbance is detected in a second rotation period which is one period before the first rotation period and when a detection timing of the second head position is included in a predetermined time range with respect to a detection timing of the non-periodic disturbance.

DETAILED DESCRIPTION OF THE INVENTION

In the following, an embodiment according to the present invention will be described with reference to the accompanying drawings.

Figure 7:
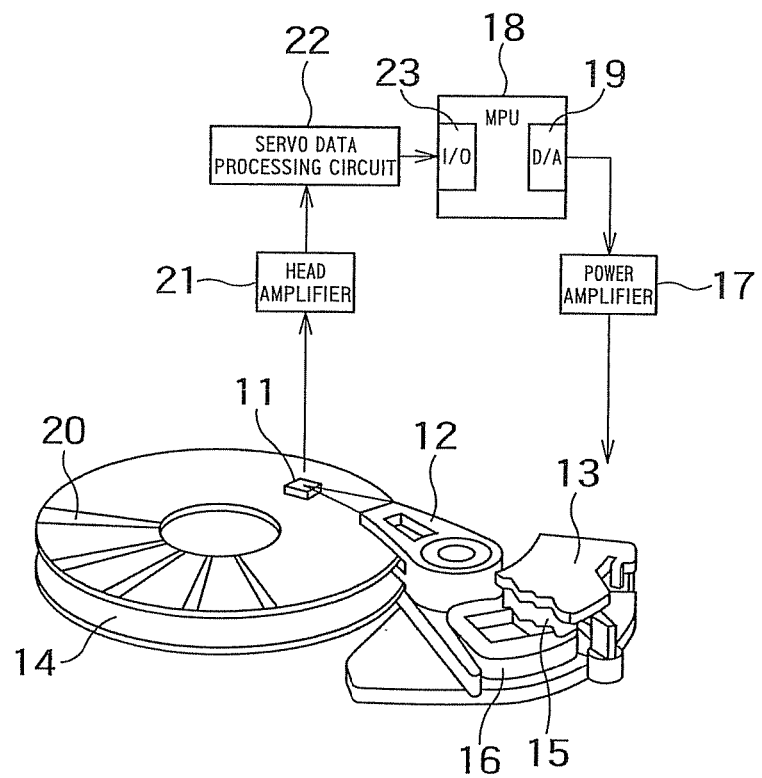
FIG. 7 is a figure showing a configuration of a positioning control system of a magnetic disk device.

FIG. 7 is a figure showing a schematic configuration of a positioning control system of a magnetic disk device according to the present embodiment. The positioning control system uses, as a main component, a microprocessor (MPU: Micro Processor Unit) 18 provided in the magnetic disk device.

As shown in FIG. 7, a head 11 is supported by an arm 12. The arm 12 moves the head 11 by a driving force of a voice coil motor (VCM) 13 in the radial direction of a magnetic disk 14 on which information can be magnetically recorded. For example, the arm 12 and the VCM 13 correspond to an example of a head moving unit.

The VCM 13 has a magnet 15 and a drive coil 16, and is driven by current supplied from a power amplifier 17.

The MPU 18 converts a position control command, which is obtained by calculation, into an analog signal by means of a D/A converter 19, and supplies the converted analog signal to the power amplifier 17.

The power amplifier 17 converts the position control command supplied from the MPU 18 into drive current, and supplies the drive current to the VCM 13.

The disk 14, which is configured by one or more sheets, is rotated at a high speed by a spindle motor (not shown). On the disk, a plurality of trucks are concentrically formed, and servo areas (servo sectors) 20 are provided in each of the tracks at regular intervals. The position information of the truck is embedded beforehand in the servo area 20. The read signal, which is read by the head 11 at the time when the head 11 crosses the servo area 20, is amplified by a head amplifier 21, so as to be supplied to a servo data processing circuit 22.

The servo data processing circuit 22 generates servo information from the amplified read signal, and outputs the generated servo information to the MPU 18 at fixed time intervals.

The MPU 18 calculates a head position on the basis of the servo information taken from an I/O 23, and then calculates, at fixed time intervals, a position control command to be supplied to the VCM on the basis of the obtained head position and a head position to be targeted (target position). The MPU 18 has a position detecting unit configured to detect the head position.

Figure 8:
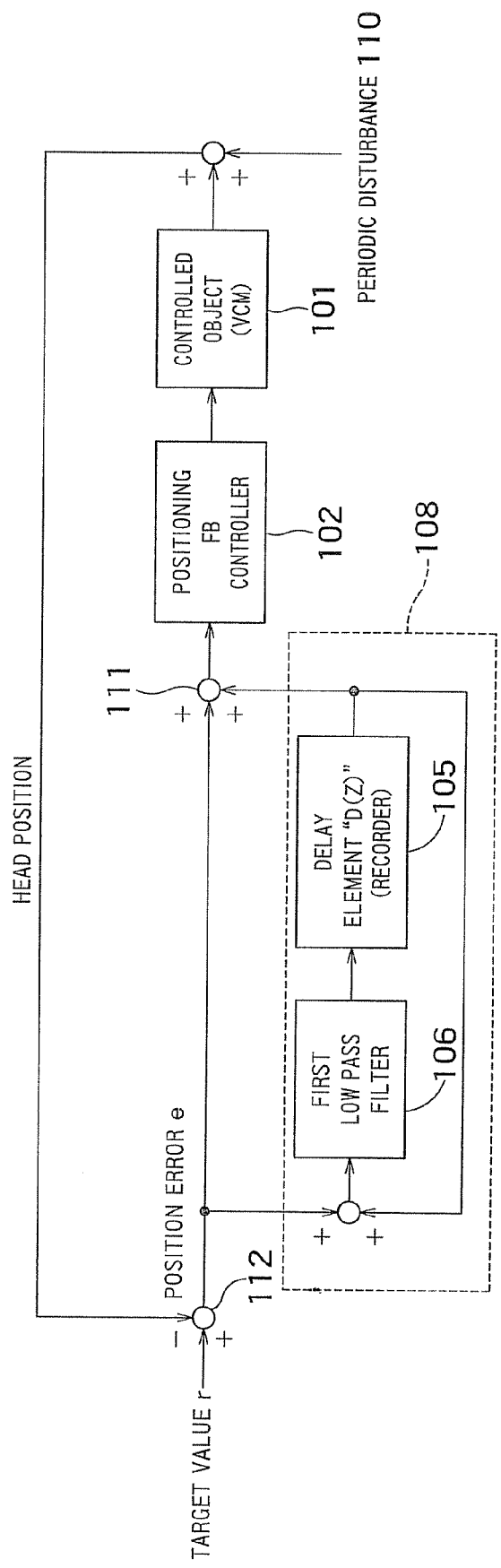
FIG. 8 is a figure showing a head positioning control system including a conventional repetitive controller.

FIG. 8 shows a head positioning control system including a conventional repetitive controller in a magnetic disk device. More particularly, FIG. 8 shows a control system at the time of positioning control (tracking). In the head positioning control system, the positioning control is performed as software by the MPU 18 except a controlled object.

It is assumed that the transfer characteristic from the VCM 13 to the head position is a controlled object 101, and that an observation signal of a feedback system is a head position signal.

An error between the head position and the center of a target track is detected as a head position error signal in an error detecting unit 112, so as to be inputted into a positioning feedback controller 102. However, a periodic disturbance 110 caused by disk eccentricity, or the like, is added to the head position error signal as described in the background art of the present invention. In order to suppress the periodic disturbance 110, a repetitive controller 108 surrounded by the broken line is provided in a preceding stage of the positioning feedback controller 102. The head position error signal detected in the error detecting unit 112, to which a signal supplied from the repetitive controller 108 is added in an addition unit 111 so as to suppress the periodic disturbance, is then supplied to the positioning feedback controller 102. The positioning feedback controller 102 generates a position control command based on the supplied signal and inputs the position control command to the controlled object (VCM) 101

The repetitive controller 108 includes a low pass filter 106 configured to adjust a high frequency band gain of the repetitive controller 108 and a delay element "D(z)" (recorder) 105.

The delay element (recorder) 105 includes, for example, a memory area or a storage secured as an array in a software (software in which a digital control system is mounted) which executes the head positioning control system, and is realized by an array having the same number of columns (or rows) as the servo sector number "N" included in one truck. In the delay element 105, a position error signal corresponding to a rotation period length (position error signal corresponding to servo sector number "N") is written in the memory area (array) for each sampling period of the digital control system. The rotation period is equal to the servo sector number "N" included in one truck, and hence the delay element 105 is expressed by formula (1).

$$D(z)=Z^{-N} \qquad (1)$$

The repetitive controller 108 outputs the position error signal corresponding to the rotation period length, which signal is recorded in the delay element 105, to an addition unit 111 so that the outputted position error signal is added to the position error signal at the corresponding time point in the next rotation period (that is, the position error signal after one period). The addition unit 111 adds the position error signal inputted from the repetitive controller 108 to the position error signal inputted from the error detecting unit 112 in the next rotation period. Thereby, the periodic disturbance is reduced, and the head positioning accuracy is improved.

However, when the above tracking control system is also used during the seek control because of the two-degree-of-freedom control configuration, there arises a problem as described in the background art of the present invention. That is, the position error signal, to which the overshoot and undershoot at the time of seek completion are added as a non-periodic disturbance, is stored in the delay element (recorder) 105. Thus, in the next period, the non-periodic disturbance component is outputted by the repetitive controller 108, so as to become a disturbance source of the head positioning control system.

Figure 1:
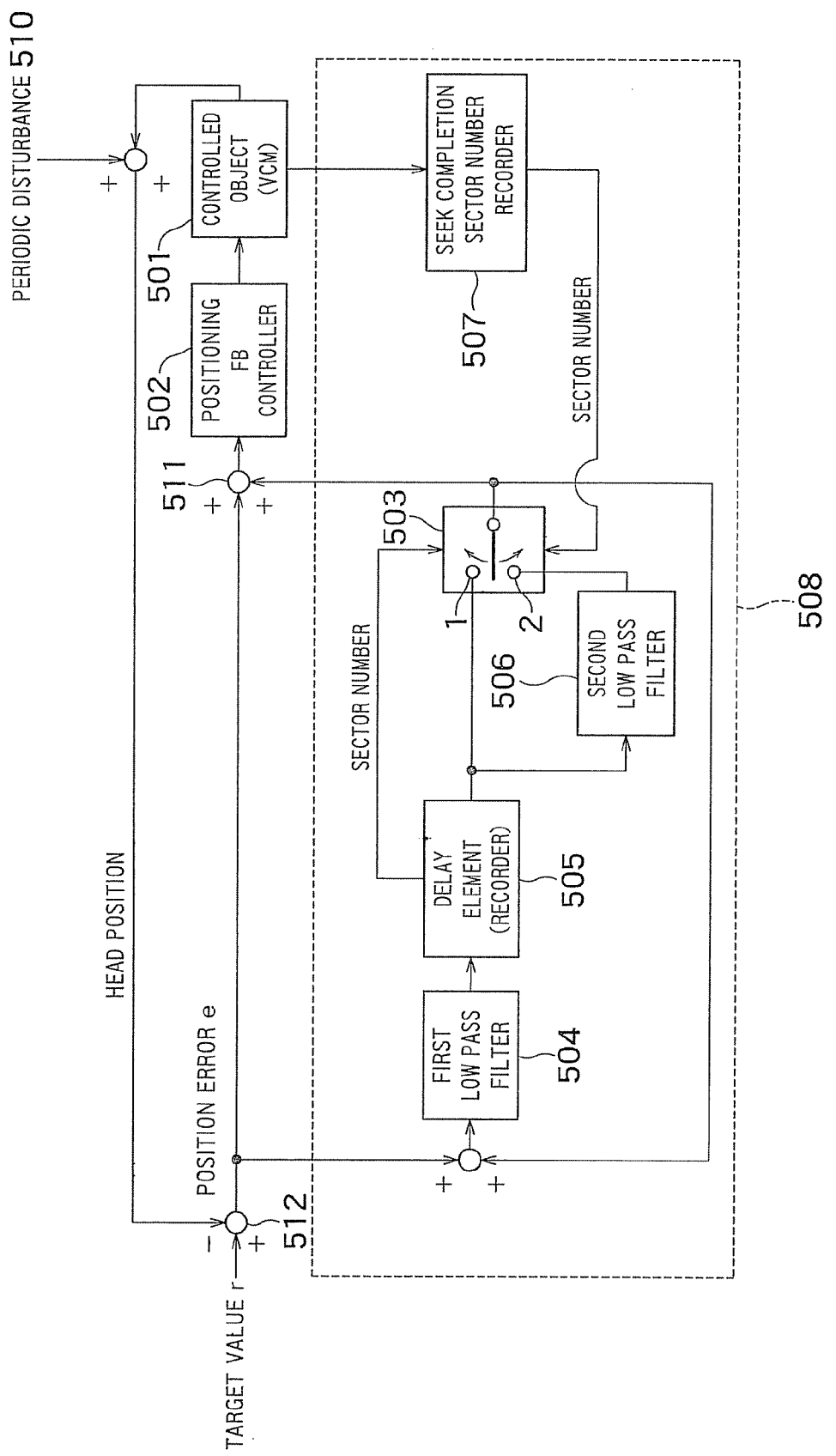
FIG. 1 is a figure showing a head positioning control system including a repetitive controller, as an embodiment according to the present invention.

FIG. 1 shows a configuration of a head positioning control system according to the present invention, for solving the above described conventional problem. The head positioning control system is featured in a repetitive controller 508 obtained by improving the repetitive controller 108 shown in FIG. 8. The head positioning control system can be mounted in the MPU 18 as a software, except a controlled object 501.

The controlled object 501, a positioning feedback controller (feedback controller) 502, a first low pass filter 504, a delay element (recorder) 505, an error detecting unit 512, and an addition unit 511 have the same functions as those of the elements which have the same names and are shown in FIG. 8, and hence the duplicate explanation thereof is omitted except for the extended processing.

A seek completion sector number recorder 507 in the repetitive controller 508 records a servo sector number (a number assigned to each servo sector) at the time of seek completion. The servo sector number at the time of seek completion is, for example, a servo sector number which is read just before the time when the seek completion is detected. The seek completion can be detected, for example, by referring to a flag which is set by a known mechanism at the time of seek completion. The seek completion sector number recorder 507 is a form of a disturbance detecting unit for detecting the non-periodic disturbance generated in the controlled object 501.

The output of the delay element 505 in the repetitive controller 508 is branched into two outputs. The one output is inputted into a switching processing unit 503 via a second low pass filter 506, and the other output is directly inputted to the switching processing unit 503.

The switching processing unit 503 includes a switch, and selects one of the output of the delay element 505 and the output of the second low pass filter by performing switching between a terminal 1 and a terminal 2. More particularly, the switching processing unit 503 selects one of the second low pass filter 506 and the delay element 505 on the basis of the present sector number given by the seek completion sector number recorder 507 and the delay element (array) 505, so as to pass the output of the selected one to the addition unit 511.

The pair of the repetitive controller 508 and the addition unit 511 corresponds, for example, to a modifying unit according to the present invention.

The delay element 505, the second low pass filter 506, and the switching processing unit 503 will be described in more detail with reference to FIG. 2 and FIG. 3.

Figure 2:
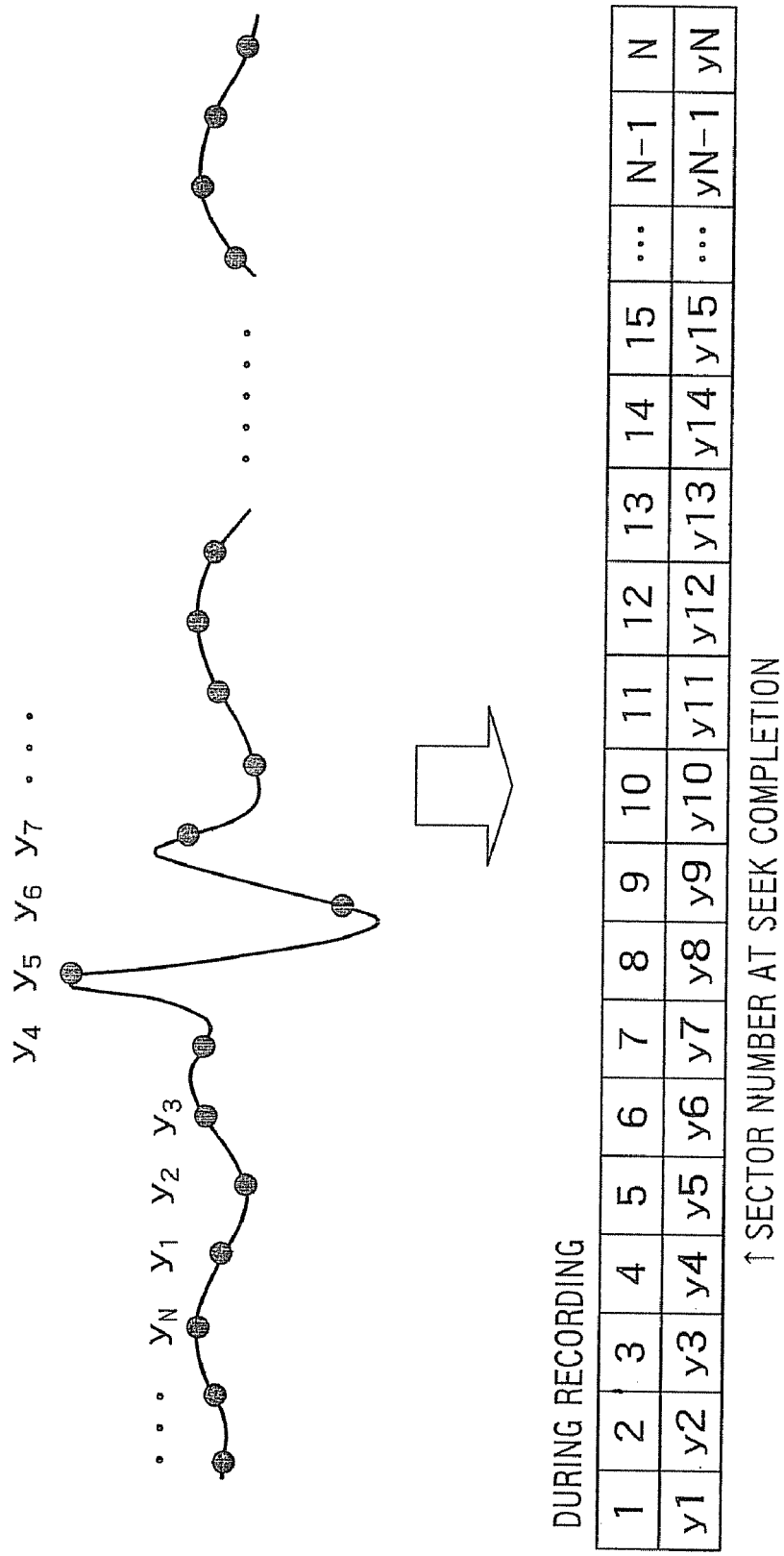
FIG. 2 is a figure showing an operation of a delay element and the generation of a non-periodic disturbance.
Figure 3:
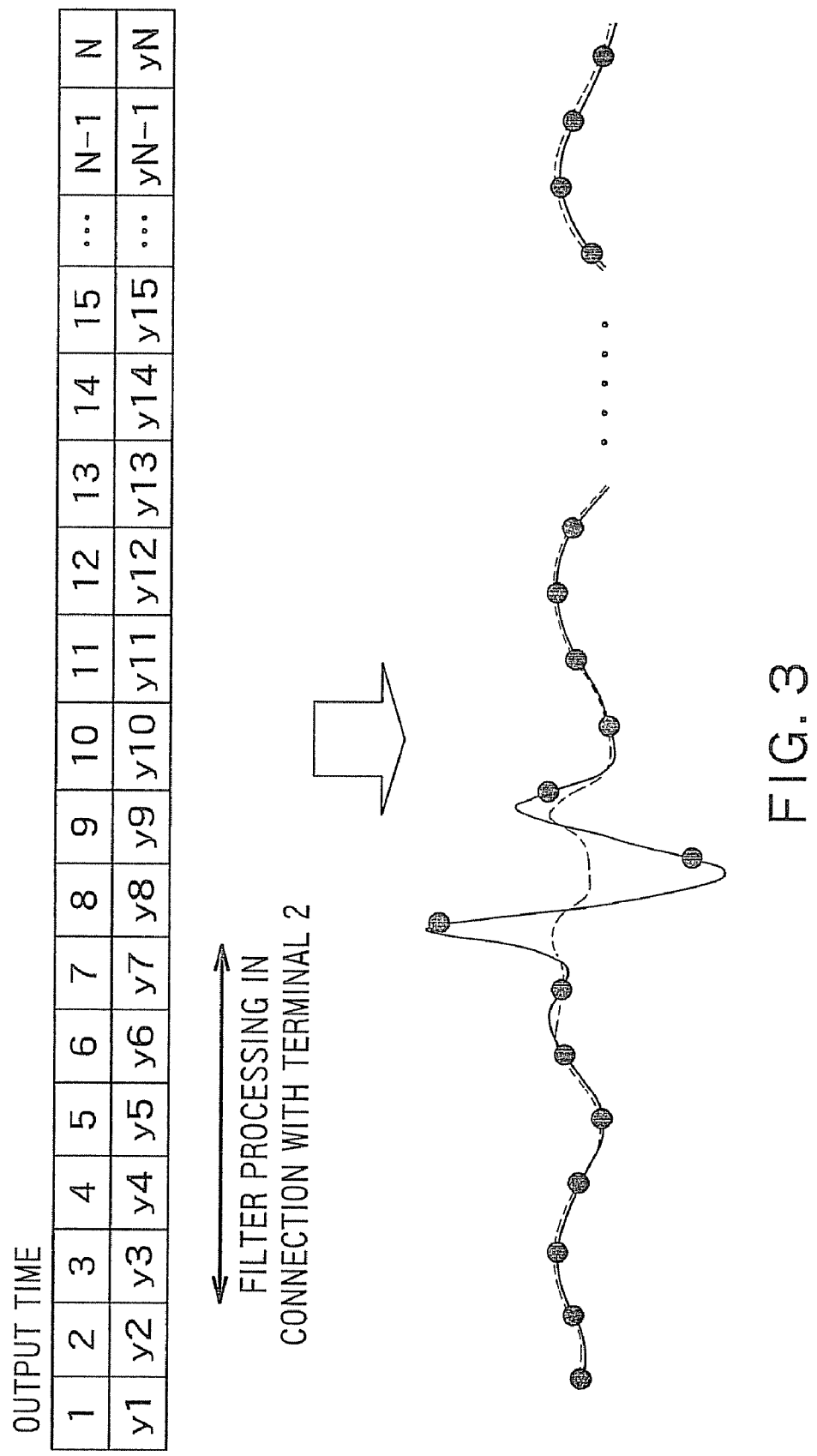
FIG. 3 is a figure for explaining filtering processing and switching processing.

The upper stage of FIG. 2 shows a state where a position error signal recorded in the repetitive controller 508 is sampled at each period of the digital control system (at each time interval between servo sectors). The lower stage of FIG. 2 shows a state where, when the delay element (recorder) 505 in the repetitive controller 508 is realized as an array, respective sampled position error signals are stored in the array. The position error signals for servo sector number "N", which are included in one truck, are stored in the array. The array is updated for each one rotation period.

The sampled position error signals "$y_x$" (x=1, 2, 3, 4 ... N) are made to respectively correspond to the servo sector numbers "X" (X=1, 2, 3, 4 ... N) assigned to the read servo sector. Each servo sector number corresponds, for example, to a detected timing of the head. The first line of the array represents the servo sector number and the second line represents the sampled position error signal. Now, it is assumed that when, after the seek control is performed, the seek operation is completed, an overshoot is caused and a transient signal is recorded in the array. At the same time with this, the number of the servo sector at which the head is positioned at the time of or just before the seek completion, is stored in the seek completion sector number recorder 507. Here, it is assumed that the servo sector number 5 is stored.

It is possible to determine that the transient position error signal at the time of seek completion (position error signal influenced by non-periodic disturbance) is stored in the columns around the servo sector number at the time of seek completion. That is, it is possible to consider that the position error signals included in a predetermined time range with respect to the time point (or detected timing) when the non-periodic disturbance is detected are influenced by the non-periodic disturbance. Thus, when the position error signals stored in the array are outputted in the next period, the switching processing unit 503 switches the switch thereof to the terminal 2 on the side of the second low pass filter 506 as shown in the upper stage of FIG. 3 so as to select the outputs of the second low pass filter 506 (so as to perform filtering processing) only around the servo sector number at the time of seek completion (here, two outputs before and after the time of seek completion). Thereby, the transient response components included in the output of the delay element 505 are attenuated (or reduced) as shown by the broken line waveform in the lower stage of FIG. 3. On the other hand, in the other cases, the switch is connected to the terminal 1, the output of the delay element 505 is selected as it is (without being subjected to any processing), similarly to the case of the conventional repetitive controller, so as to be supplied to the addition unit 511.

When such processing is performed, only the transient response at the time of seek completion can be removed. This makes it possible to suppress the reverse effect phenomenon as described in the background art of the present invention, while maintaining the performance of suppressing the periodic disturbance as much as possible. That is, when the output of the delay element 505 is always subjected to the filter processing (when it is configured such that the output of the second low pass filter 506 is always selected), there arises a problem that the effect of the repetitive controller 508 for suppressing the periodic disturbance is reduced. However, in the present embodiment, the local filtering processing utilizing the servo sector number is performed, and hence it is possible to prevent the reverse effect phenomenon due to the non-periodic disturbance without deteriorating the effect of suppressing the periodic disturbance as much as possible.

Here, a non-causal FIR filter can be used as the second low pass filter 506 because of the characteristic of the repetitive control that the values stored in the array of the delay element 505 are outputted in the next period. With the use of the non-causal FIR filter, it is possible to prevent the phase distortion from being generated according to the filtering processing in the second low pass filter 506, and possible to attenuate (or reduce) only the amplitude of the transient response. The non-causal FIR filter "H(z)" is expressed by formula (2).

$$H(z)=a_0+a_1(z+z^{-1})+a_2(z^2+z^{-2})+\ldots+a_n(z^n+z^{-n}) \quad (2)$$

Here, "$a_0, a_1, a_2 \ldots a_n$" are filter coefficients and "n" is an order. These are suitably selected so that the transient response can be sufficiently attenuated.

In the following, the effectiveness of the present invention will be described on the basis of results of computer simulation independently performed by the present inventors.

Figure 4:
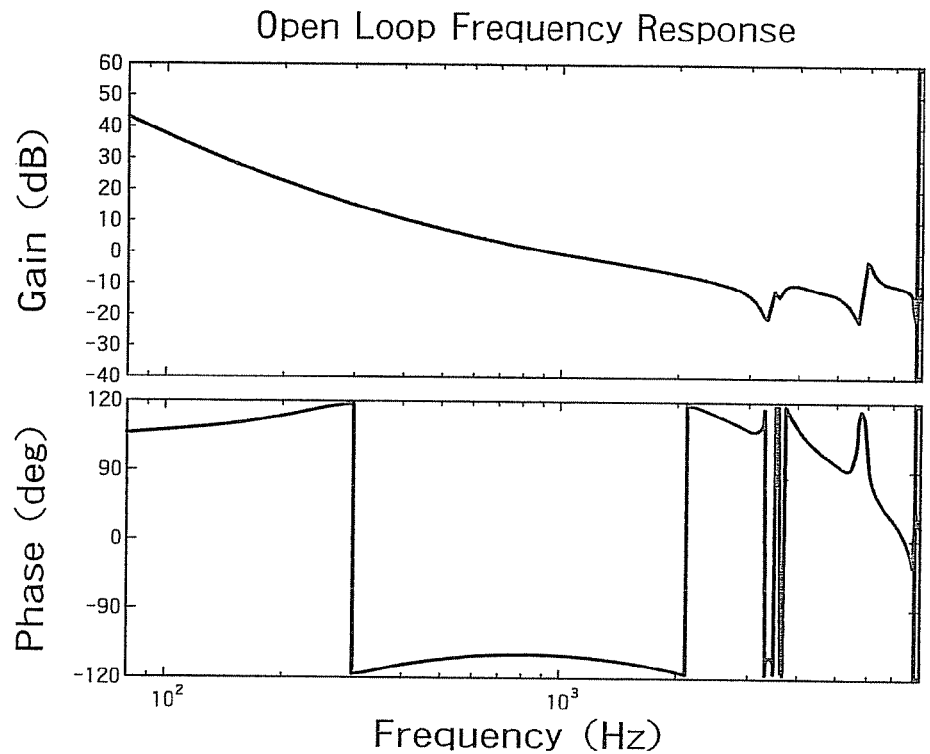
FIG. 4 is a figure showing an open loop transfer characteristic of a simulation model.

FIG. 4 shows an open loop transfer characteristic in the case where a controlled object model and a positioning feedback controller, which are used in the simulation, are coupled in series (for example, an open loop transfer characteristic obtained by removing the repetitive controller 508 in the head positioning control system shown in FIG. 1).

This simulates the transfer characteristic from the VCM to the head position of an actual magnetic disk device, and is based on the assumption that the controlled object has resonance modes at approximately 3 (kHz) and 5 (kHz), and that the positioning feedback controller is configured by coupling an integrator, a phase lead compensator, and a notch filter for stabilizing the resonance mode. Further, the sampling frequency of the digital control system is determined from the number of servo sectors and the number of revolutions of the disk. Here, it is assumed that the number of servo sectors is 132, and that the number of revolutions of the disk is 7200 [rpm] (120 [Hz]). Therefore, the sampling frequency becomes 15840 [Hz], and the lowest order frequency of the periodic disturbance which is added to the position error signal and which is caused by disk eccentricity, or the like, becomes 120 [Hz]. Hence, a higher order frequency component of the periodic disturbance has an integer multiple of the lowest order frequency. Also, the recorder in the repetitive controller is realized by an array of 132 rows.

Figure 5:
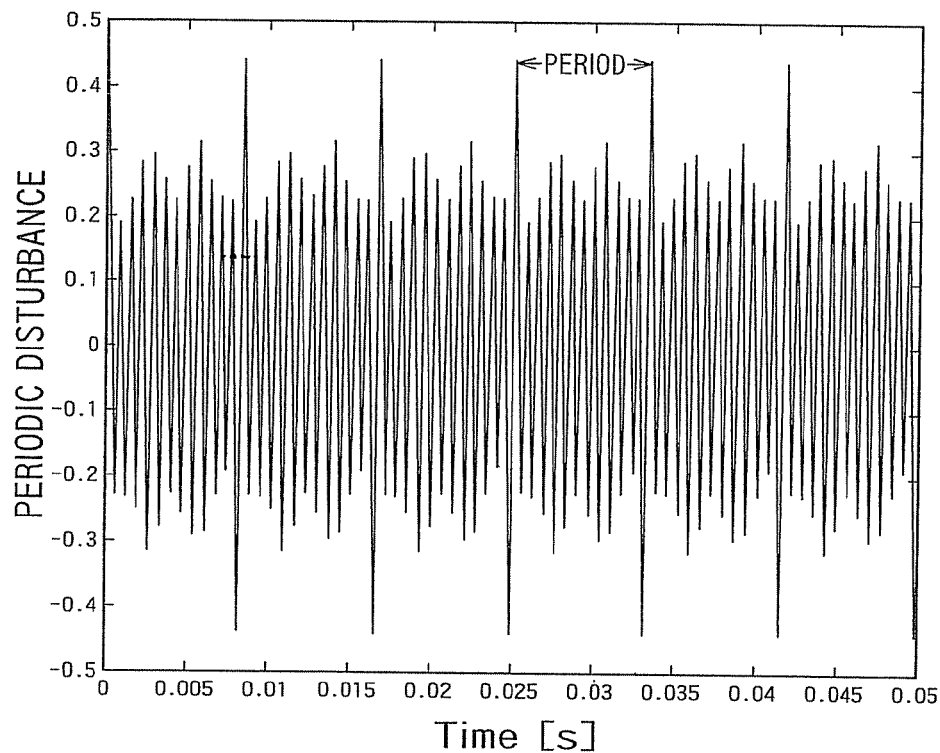
FIG. 5 is a figure showing a periodic disturbance given to a position error signal in the simulation.

In the case where a periodic disturbance shown in FIG. 5 is added to the position error signal in the above described control system, the head positioning error response (an error from a target position) in the transition state from the time of seek completion to the tracking control, is compared between the conventional repetitive controller and the repetitive controller according to the present invention. The comparison result is shown in FIG. 6.

Figure 6:
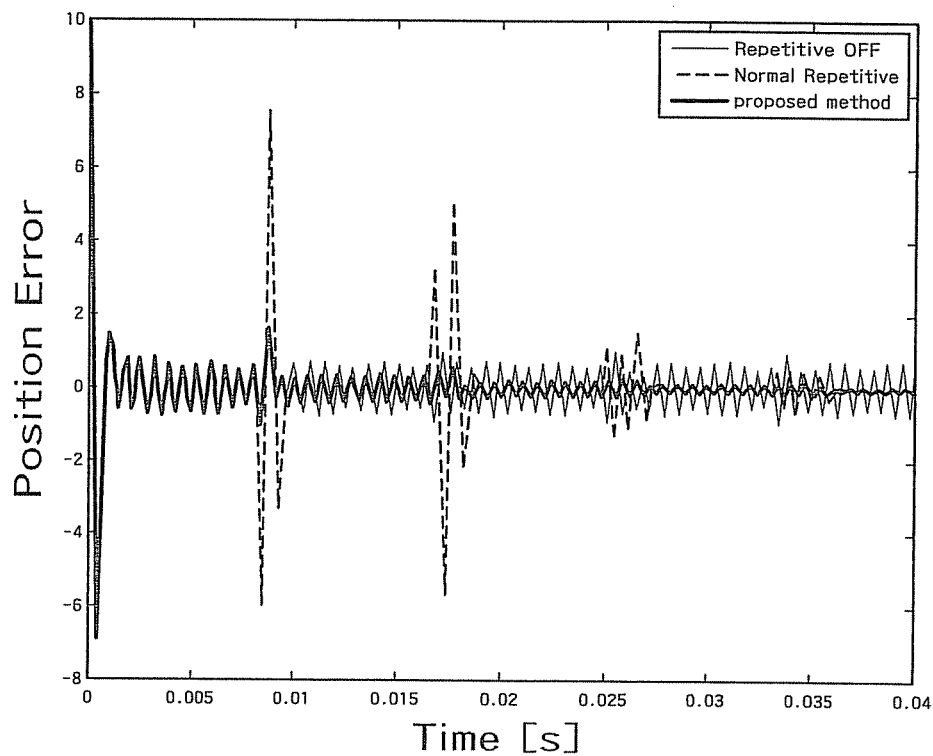
FIG. 6 is a figure showing a result of comparison between the repetitive control according to the present invention and the conventional repetitive control.

In FIG. 6, the thin solid line graph shows a head positioning error response in the case where the repetitive control is not applied (Repetitive OFF). It can be seen from the figure that the oscillation is continued due to the influence of the periodic disturbance.

On the other hand, as shown by the broken line graph, it can be confirmed that in the case where the conventional repetitive controller is used, the influence of periodic disturbance is removed with the lapse of time (Normal Repetitive). However, it can be seen that the reverse effect phenomenon of the repetitive control is caused by the transient response (non-periodic disturbance) at the time of when the seek operation is completed in the time period from 0 to 0.002 [s], and that the positioning error is increased for each rotation period as compared with the case where the repetitive control is not applied (Repetitive OFF).

On the other hand, as shown by the thick solid line graph, it can be confirmed that the reverse effect phenomenon is significantly reduced in the repetitive controller according to the present invention. Further, it can be seen that the influence of the periodic disturbance is also removed as in the case of the conventional repetitive control.

As described above, according to the embodiment of the present invention, in the head positioning control system of the magnetic disk, in which system the repetitive controller is used, it is possible to reduce the deterioration in the positioning accuracy (the reverse effect phenomenon of the repetitive control) caused by the transient disturbance at the time of seek completion.

Note that in the present embodiment, the non-periodic disturbance at the time of seek completion is taken as an example, but the non-periodic disturbance taken as the subject of the present invention is not limited to the non-periodic disturbance at the time of seek completion, and that the other disturbance may also be taken as the subject of the present invention, as long as the disturbance is non-periodically added to the detected head position signal.

What is claimed is:

1. A positioning control system comprising:
a head moving unit configured to move a head for recording and reproducing of information on a disk on which information can be recorded;
a position detecting unit configured to detect a position of the head at predetermined time intervals;
an error detecting unit configured to detect a position error signal representing an error between a detected head position and a target position set in advance;
a storage configured to store the detected position error signal in association with a detected timing of the head position;
a disturbance detecting unit configured to detect a non-periodic disturbance generated in the head moving unit;
a modifying unit configured to modify a first position error signal corresponding to a first head position detected in a first rotation period of the disk, on the basis of a second position error signal corresponding to a second head position detected one period length before the first head position; and
a feedback controller configured to calculate a position control command according to a modified first position error signal and supplies the position control command to the head moving unit, wherein
the modifying unit reduces an amplitude of the second position error signal and modifies the first position signal error on the basis of an amplitude-reduced second position error signal, when the non-periodic disturbance is detected in a second rotation period which is one period before the first rotation period and when a detection timing of the second head position is included in a predetermined time range with respect to a detection timing of the non-periodic disturbance.

2. The system according to claim 1, wherein
the disk has a plurality of servo sectors each including track position information,
the position detecting unit detects the head position on the basis of track position information read from the servo sector by the head at the time when the head passes the servo sector,
the storage stores the detected position error signal in association with a servo sector number of the servo sector which corresponds to the detecting timing of the head,
the disturbance detecting unit specifies servo sector numbers of servo sectors at which a head position has detected in the predetermined time range with respect to the detecting timing of the non-periodic disturbance, as disturbance servo sector numbers and
the modifying unit
modifies the first position error signal on the basis of the second position error signal having same servo sector number as that of the first position error signal, and
reduces the amplitude of the second position error signal when the servo sector number corresponding to the second position error signal is included in disturbance servo sector numbers specified for the non-periodic disturbance detected in the second rotation periodic.

3. The system according to claim 1, wherein the disturbance detecting unit detects completion of seek control of the head as the non-periodic disturbance.

4. The system according to claim 1, wherein the modifying unit reduces the amplitude by using a low pass filter.

5. A positioning control method comprising:
moving a head for recording and reproducing of information on a disk on which information can be recorded;
detecting a position of the head at predetermined time intervals;
detecting a position error signal representing an error between a detected head position and a target position set in advance;
recording the detected position error signal in association with a detected timing of the head position in a storage;
detecting a non-periodic disturbance generated at a time of moving of the head;
modifying a first position error signal corresponding to a first head position detected in a first rotation period of the disk, on the basis of a second position error signal corresponding to a second head position detected one period length before the first head position; and
calculating a position control command according to a modified first position error signal and supplies the position control command to the head moving unit, wherein
the modifying includes reducing an amplitude of the second position error signal and modifying the first position signal error on the basis of an amplitude-reduced second position error signal, when the non-periodic disturbance is detected in a second rotation period which is one period before the first rotation period and when a detection timing of the second head position is included in a predetermined time range with respect to a detection timing of the non-periodic disturbance.

6. The method according to claim 5, wherein
the disk has a plurality of servo sectors each including track position information,
the detecting a position of the head includes detecting the head position on the basis of track position information read from the servo sector by the head at the time when the head passes the servo sector,
the storing includes storing the detected position error signal in association with a servo sector number of the servo sector which corresponds to the detecting timing of the head position,
the detecting a non-periodic disturbance includes specifying servo sector numbers of servo sectors at which a head position has detected in the predetermined time range with respect to the detecting timing of the non-periodic disturbance, as disturbance servo sector numbers and
the modifying includes
modifying the first position error signal on the basis of the second position error signal having same servo sector number as that of the first position error signal, and
reducing the amplitude of the second position error signal when the servo sector number corresponding to the second position error signal is included in disturbance servo sector numbers specified for the non-periodic disturbance detected in the second rotation periodic.

7. The method according to claim 5, wherein the detecting a non-periodic disturbance includes detecting completion of seek control of the head as the non-periodic disturbance.

8. The method according to claim 5, wherein the modifying includes reducing the amplitude by using a low pass filter.

* * * * *